July 17, 1962   E. C. BERNHARDT ETAL   3,044,118
MOLDING METHOD AND APPARATUS
Filed June 23, 1958
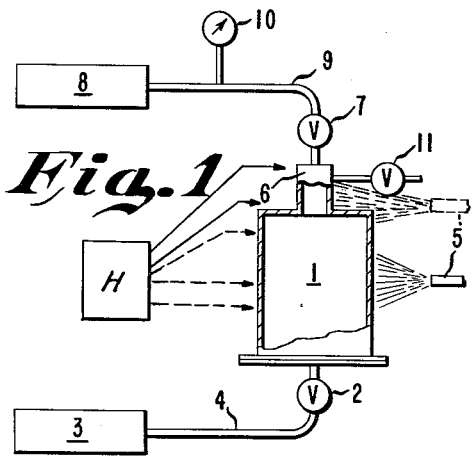
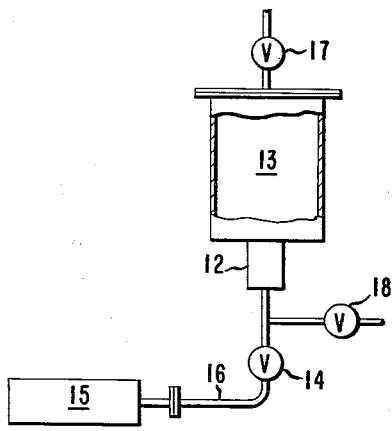
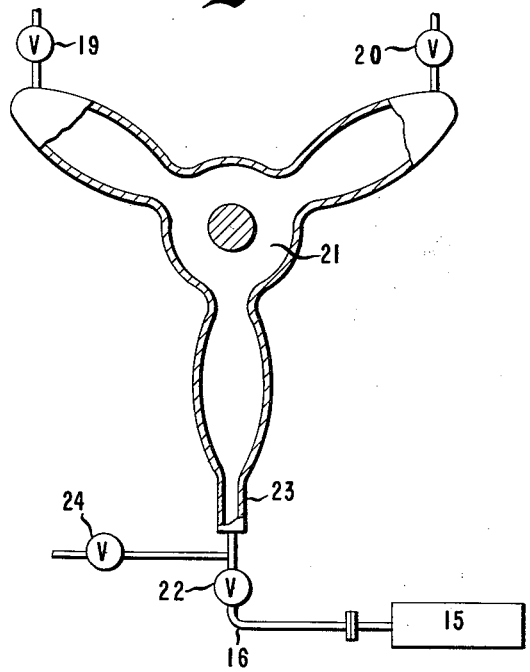
INVENTORS
EARNEST CARL BERNHARDT
FRANCIS HARRY SKEWIS
BY *A. McAleny*
ATTORNEY

United States Patent Office

3,044,118
Patented July 17, 1962

3,044,118
MOLDING METHOD AND APPARATUS
Ernest Carl Bernhardt and Francis Harry Skewis, Wilmington, Del., assignors to E. I. du Pont de Nemours and Company, Wilmington, Del., a corporation of Delaware
Filed June 23, 1958, Ser. No. 743,645
9 Claims. (Cl. 18—26)

This invention relates to a novel method and apparatus for molding thermoplastic materials, especially those having a relatively narrow range of temperature between the melting temperature and the decomposition temperature, and a high degree of shrinkage during cooling and solidification, e.g. synthetic linear polycarbonamide resins.

Heretofore numerous methods and devices have been employed for producing elongated shapes and other forms of shaped articles, from plastic substances. For example, it has been known that moveable press members can be employed to compensate for volume changes during cooling and solidification of the plastic material in the mold. These methods have been somewhat deficient, especially in the production of large articles, which frequently contained internal strains, and lacked the maximum strength known to be attainable on the basis of properties of the unstrained material when present in shaped articles having smaller dimensions. To eliminate these difficulties, efforts have been made to devise processes involving the cooling of the plastic material after filling the mold while simultaneously injecting more plastic material to compensate for the volume change occurring due to cooling and solidification. The latter methods have given promising results but have been somewhat disadvantageous, especially where the article to be formed was quite large. For example, the distance between the injection means (usually an extruder) and the floor supporting same was itself a limiting factor since the injection, during the cooling stage, had to be at the top of the mold, and the mold had to stay connected to the extruder during cooling. Since the cooling step was unavoidably slow, these limitations were rather serious, especially in requiring so large an extrusion capacity in the plant as to make the large moldings economically unattractive.

An object of the present invention is to overcome these disadvantages. Other objects will become apparent hereinafter.

According to the present invention, a method is provided which comprises injecting into a cavity, comprising a mold-cavity and a reservoir space, through a port at the base of the mold cavity-reservoir assembly, a melt of said thermoplastic material, while displacing gas from said mold cavity, continuing the injection of melt until the mold cavity is filled and the reservoir is at least partly filled with said melt, cooling the melt in the mold cavity to produce solidification of said melt, applying gas pressure to the surface of the melt in the reservoir whereby the melt flows into the mold cavity from the reservoir in sufficient quantity to compensate for the volume change attending the solidification and cooling of the thermoplastic material in the mold cavity, thereafter cooling the remaining molten thermoplastic material in the reservoir to produce solidification thereof, and removing the solidified material from the mold cavity-reservoir assembly.

In particular embodiments, the said gas is nitrogen or another inert gas such as carbon dioxide.

Suitable thermoplastic materials are the synthetic linear polycarbonamides, linear polyesters such as diphenylol propane polycarbonates, polyolefines, and the like. The method of the invention is especially advantageous in shaping thermoplastic materials which cannot be heated to temperatures high enough to produce a low viscosity, i.e. resins which decompose when heated to said temperatures, or which have melts which are highly viscous even at high temperatures.

The invention is not limited to the use of a mold cavity which communicates with only one reservoir. More than one reservoir may be desirable, especially where complex shapes are to be produced, as explained hereinafter in greater detail. Moreover, it is sometimes desirable to provide at least one vent, which may be a valved port at the top of the reservoir, through which the displaced gas can be withdrawn. These vents need not be in the reservoir, but should be at the topmost parts of the cavity, opposite the valved inlet.

The invention is more fully described by reference to the accompanying drawings. FIGURE 1 shows a mold 1, having a valved inlet 2 for admission of thermoplastic material supplied by the extruder 3 through the feed line 4. The mold 1 has a removable base and is equipped with an electrical heating means not shown, and a means for cooling 5, adapted to be moved along the exterior of the mold 1. Communicating with the mold cavity is a reservoir 6, which is equipped with a gas inlet and outlet valve 7, which permits access to a source of nitrogen under pressure 8 through the line 9 on which there is a pressure gauge 10. A second valve, port 11, for overflow of molten material or relief of gas pressure, is also provided.

In the operation of this device, the thermoplastic material is fed through the inlet valve 2 while the mold cavity-reservoir assembly, which has previously been filled with $N_2$, is heated to above the melting point of the thermoplastic material. Feeding is thus continued while displacing the nitrogen through the valve 11 (or the valve 7) until the melt reaches or approaches the level of the valve 11. The valve 11 is then closed and nitrogen pressure is applied at atmospheric pressure, or at a superatmospheric pressure which does not have to exceed about 1000 p.s.i., high pressures being more effective when the shape of the mold is such that long channels must be filled. The heater on the mold is then shut off, and cooling is started at the end opposite the reservoir. During cooling of the melt in the mold, the melt in the reservoir moves into the mold in response to the nitrogen pressure applied against the surface of the melt in the reservoir. When the contents of the mold cavity have solidified, the heat is shut off from the reservoir contents, and cooling thereof is commenced. When the contents of the mold cavity-reservoir assembly has solidified, the base of the mold is removed and the article is removed. The molding is placed in an oven at 350° F. overnight for annealing, then allowed to cool spontaneously after removal from the oven.

Another embodiment of the invention is shown in FIGURE 2. In this embodiment the reservoir 12 is at the base of the mold cavity 13 and the resin inlet valve 14 is located at the base of the reservoir, which is fed from the extruder 15 through the feed line 16. A vent 17 is positioned at the topmost part of the assembly. After the filling of the mold, the assembly is removed from the extruder and turned upside-down, whereupon nitrogen pressure is exerted on the reservoir contents through the valve 18. Cooling is conducted as in the embodiment previously described.

Still another embodiment is shown in FIGURE 3, which illustrates a device of the same general character as FIGURE 2, except that the molded article is a propeller, and two vents, 19 and 20, are provided at the topmost parts of the propeller blades. The mold cavity 21 is filled as in the embodiment just described by injection of the thermoplastic material through the port 22. After filling the heated mold, the mold assembly is removed from the extruder and inverted. During the cooling which follows, nitrogen is injected under pressure into the reservoir 23 through the valved port 24.

The invention is illustrated further by means of the following example:

Example

Using the apparatus illustrated in FIGURE 1 of the drawing, polyhexamethylene adipamide is extruded into the base of the mold cavity while maintaining the temperature thereof at 525° F. by means of a heater (cf. H, FIG. 1). The mold cylinder had an inside diameter of six inches, and was 24 inches long. The reservoir, which was similarly heated, communicated with the mold cavity had an inside diameter of 4 inches and a length of 12 inches. The injection of the polyhexamethylene adipamide consumed one hour, the mold cavity and reservoir space being filled to the over-flow valve at the top of the reservoir. At this time the melt valve at the base of the mold cavity was closed. The heat was then turned off the mold, but kept on the reservoir and a spray of cooling water was applied against the exterior of the mold. The gas inlet valve was opened, thus permitting nitrogen at a pressure of 750 p.s.i. to enter the reservoir. Cooling began at the bottom of the mold cavity and was progressively continued toward the reservoir. At the end of the cooling cycle, two-thirds of the polyhexamethylene adipamide in the reservoir had moved into the mold cavity. Finally the reservoir contents were cooled. The base of the mold was removed and the molded piece was withdrawn from the mold. The cooling operation consumed three hours. After removal from the mold, the article was annealed overnight in an oven at 350°, then permitted to cool spontaneously under room temperature conditions.

The invention is especially effective in the production of large shaped objects, where the shape is irregular, such as propeller blades and the like.

We claim:

1. A process for molding thermoplastic materials which comprises injecting into a cavity, comprising a mold-cavity and a reservoir space, through a port at the base of the mold cavity-reservoir assembly, a melt of said thermoplastic material, while displacing gas from said mold cavity, continuing the injection of melt until the mold cavity is filled and the reservoir is at least partly filled with said melt, cooling the melt in the mold cavity to produce solidification of said melt, applying gas pressure directly to the surface of the melt in the reservoir whereby the melt flows back into the mold cavity from the reservoir in sufficient quantity to compensate for the volume change attending the solidification and cooling of the thermoplastic material in the mold cavity, thereafter cooling the remaining molten thermoplastic material in the reservoir to produce solidification thereof, and removing the solidified material from the mold cavity-reservoir assembly.

2. Process of claim 1 wherein said gas is nitrogen.

3. Process of claim 2 wherein said thermoplastic material is a synthetic linear polycarbonamide.

4. A process for molding thermoplastic materials which comprises injecting into a mold cavity, through a port at the base thereof, a melt of said thermoplastic material, said mold cavity communicating with a reservoir at the top thereof, continuing the injection of said thermoplastic material while thereby displacing gas from the mold cavity through a vent at the top of the said reservoir, until the thermoplastic material fills the mold cavity and at least partially fills the said reservoir, closing the port through which the thermoplastic material has entered the molds, thereafter applying gas pressure directly on the surface of the molten thermoplastic material in the said reservoir, cooling the mold contents to produce solidification thereof while maintaining the reservoir contents molten, whereby molten thermoplastic material flows back from the reservoir into the mold cavity to compensate for the volume change accompanying said solidification and cooling, thereafter cooling the remaining molten thermoplastic material in the reservoir to produce solidification thereof, and removing the solidified material from the the mold cavity-reservoir assembly.

5. Process of claim 4 wherein said gas is nitrogen.

6. Process of claim 5 wherein the thermoplastic material is a synthetic linear polycarbonamide.

7. Apparatus for molding a thermoplastic material comprising a mold having a valved inlet at the base thereof for injection of thermoplastic material, and at least one reservoir communicating with said mold, said mold and reservoir being provided with a means for heating same to above the melting temperature of the thermoplastic material, and means for cooling the mold progressively from the end thereof opposite said reservoir, means for cooling the reservoir subsequent to the cooling of the mold, a valved port for admitting gas into and withdrawing gas from said reservoir, and means for supplying gas at controlled pressure through the said valved port to the reservoir space.

8. Apparatus for molding a thermoplastic material comprising a mold having a valved inlet at the base thereof for injection of thermoplastic material, at least one reservoir communicating with said mold at at least one position opposite said valved inlet, and a valved port at the top of at least one of said reservoirs, said mold and reservoir being provided with a means for heating same to above the melting temperature of the thermoplastic material, and means for cooling the mold progressively from the end thereof opposite said reservoir, means for cooling the reservoir subsequent to the cooling of the mold, said valved port being adapted for admitting gas into and withdrawing gas from said reservoir, and means for supplying gas at controlled pressure through the said valved port to the reservoir space.

9. Apparatus for molding a thermoplastic material comprising a mold having a valved inlet at the base thereof for injection of thermoplastic material, and at least one reservoir communicating with said mold, said mold and reservoir being provided with a means for heating same to above the melting temperature of the thermoplastic material, and means for cooling the mold progressively from the end thereof opposite said reservoir, means for cooling the reservoir subsequent to the cooling of the mold, a valved port for admitting gas into and withdrawing gas from said reservoir, and means for supplying gas at controlled pressure through the said valved port to the reservoir space and at least one vent in the mold cavity-reservoir space at a position opposite the said valved inlet.

References Cited in the file of this patent

UNITED STATES PATENTS

| Number | Name | Date |
|---|---|---|
| 806,783 | Dayton | Dec. 12, 1905 |
| 1,476,828 | Monrath | Dec. 11, 1923 |
| 2,178,774 | Bogoslowsky | Nov. 7, 1939 |
| 2,305,362 | Taylor | Dec. 15, 1942 |
| 2,314,378 | Van Rosen | Mar. 23, 1943 |
| 2,435,610 | Schneider | Feb. 10, 1948 |
| 2,470,089 | Booth | May 17, 1949 |
| 2,478,013 | Roddy | Aug. 2, 1949 |
| 2,757,416 | Montross | Aug. 7, 1956 |
| 2,781,547 | Moxness | Feb. 19, 1957 |